W. B. LASHAR.
TIRE GRIP.
APPLICATION FILED OCT. 7, 1909.
1,101,198.
Patented June 23, 1914.
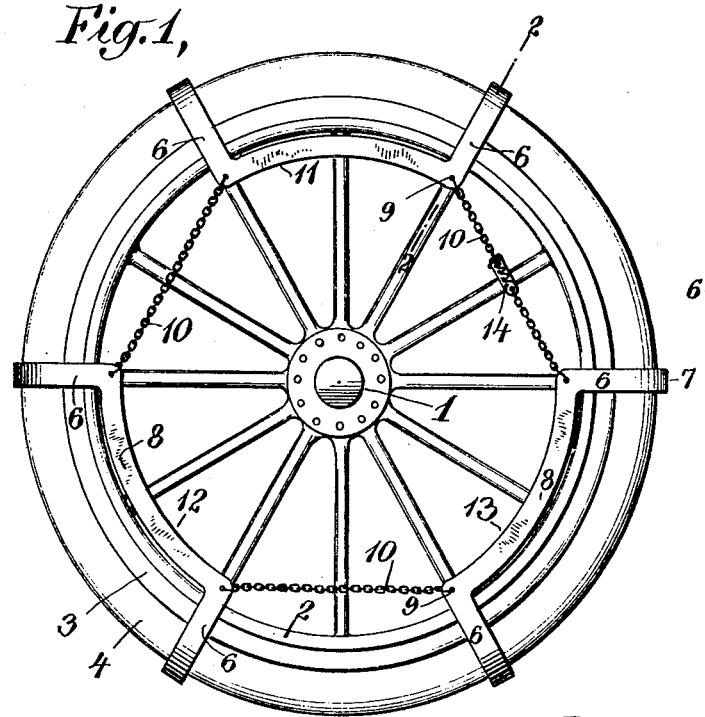
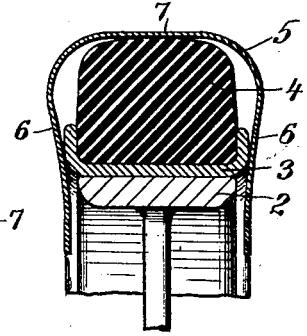
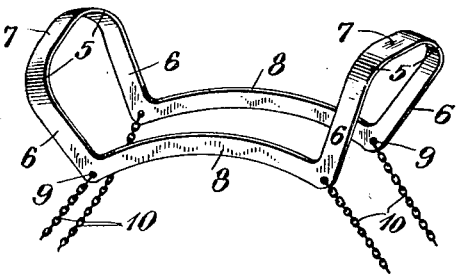
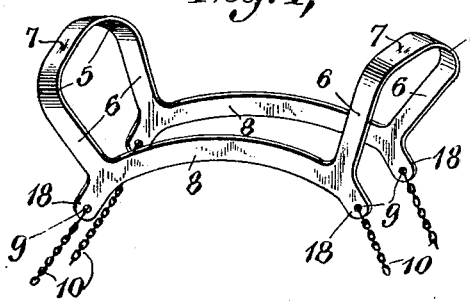
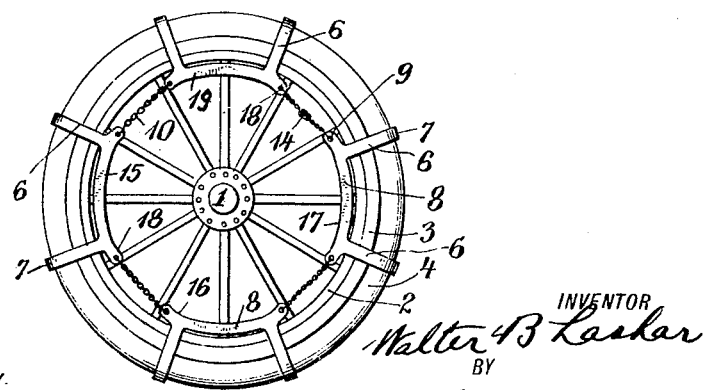

UNITED STATES PATENT OFFICE.

WALTER B. LASHAR, OF BRIDGEPORT, CONNECTICUT, ASSIGNOR TO WEED CHAIN TIRE GRIP COMPANY, OF BRIDGEPORT, CONNECTICUT, A CORPORATION OF NEW YORK.

TIRE-GRIP.

1,101,198.  Specification of Letters Patent.  Patented June 23, 1914.

Application filed October 7, 1909. Serial No. 521,542.

*To all whom it may concern:*

Be it known that I, WALTER B. LASHAR, a citizen of the United States, and resident of Bridgeport, in the county of Fairfield and State of Connecticut, have made certain new and useful Inventions Relating to Tire-Grips, of which the following is a specification taken in connection with the accompanying drawings, which form part of the same.

This invention relates to tire grips comprising a plurality of connected compound grip units of resilient material each having a plurality of circumferentially spaced tread members and connected supports on both sides of the rim, such grips having proved of especial advantage with solid type tires.

In the following drawings showing in a somewhat diagrammatic manner, illustrative embodiments of this invention, Figure 1 is an elevation showing a form of grip applied to a wheel. Fig. 2 is an enlarged sectional view taken along the line 2—2 of Fig. 1. Fig. 3 is an enlarged perspective view of one of the grip units. Fig. 4 is a similar view containing a different form of resilient unit. Fig. 5 shows another arrangement of grip units in position on a wheel.

As indicated in the drawings, the grip may comprise a plurality of compound grip units held upon the resilient tire of the solid or other type by suitable connectors in the form of chains or the like which tends to some extent to prevent deformation of the grip units as well as hold them securely in position, although, of course, sufficient creeping should be allowed to prevent objectionable localized wear on the tire or other bad effects. Each grip unit may as illustrated in Fig. 3 comprise a plurality of substantially radially arranged tread members of arched form comprising as indicated a substantially flat face 7 connected by the curves 5 with the sides 6. As illustrated in Fig. 2 the sides 6 may be brought together somewhat so as to have a suitable alining action in connection with the rim 3 secured in any way upon the felly 2 of the wheel having the hub 1; engagement between the tread member and the tire 4 may thus be prevented, except where the flat face 7 engages the tire tread. Any desired number of these tread members may be secured to suitable supports, such as 8, on both sides of the wheel as by forming the grip units from a single piece of sheet metal and bending or forging the same, or by welding or otherwise securing the various parts. The tread members of a single unit should, however, for best results be spaced apart sufficiently so that under normal conditions only one tread member of the unit is brought strongly into engagement with the ground at any one time. By having each unit comprise two tread members connected to the supports adjacent to their ends so that the circumferentially extending or spanning supports hold the tread members apart sufficiently on the tire so that only one of them can be in engagement with the ground at once under normal service conditions a balanced and symmetrical action is secured. The parts of the grip unit which should preferably be formed of tempered steel or other resilient material and be of such width and thickness as to promote the resilient spring action of each strip have a mutually restoring and supporting action under operating conditions. When, for example, one of the tread members is in contact with the ground and because of the uneven ground surface or otherwise, a flattening or spreading action is exerted on this tread member, such action is resisted not only by the resiliency of the other tread members of the grip unit, but also by the resiliency of the supports connected thereto and the alining action of the unit in connection with the rim, where the side members are brought into close engagement therewith. The mutual supporting action of the various parts of the grip unit tends to prevent the deformation to which the tread members would otherwise be subject under service conditions and very materially promotes their effective life. While of course the adjacent tread members of the different grip units may be arranged at any distance apart on the tire the connectors or chains 10 which should of course have sufficient strength for service conditions and which are diagrammatically shown engaging suitable apertures 9 in the units, may have such length as to uniformly space the tread members around the rim. One of these chains on each side of the wheel may as indicated have a suitable detachable hook device 14 so that the grips 11, 12 and 13 shown in Fig. 1 for instance, may be detached from the wheel and the various units assembled in quite a compact manner when not in use. In some cases it is desirable to have the lateral supports extended a considerable distance beyond the terminal tread members secured thereto, since this not only minimizes the length of the connectors or chains necessary, but also promotes the restoring action of the parts, since the adjacent support ends are more securely held in proper position on the wheel in this way. As shown in Fig. 4 the supports 8 may be provided with the ends 18 which may project to the extent indicated, or even considerably farther beyond the arched tread members which as indicated may be formed integral with or securely welded or otherwise fastened to the supports. Three such grip units may of course be used on a wheel such as shown in Fig. 1 and the tread members would have a similar spacing around the circumference when the units are connected with shorter chains 10 than are indicated in Fig. 1.

In the form of the device shown in Fig. 5, four of the compound grip units 15, 16, 17 and 19 are shown as mounted on a wheel with connectors 10 of such length as to give substantially uniform spacing between the tread members which should as explained be sufficiently far apart circumferentially around the wheel so that strong deforming pressure from the ground shall not be simultaneously exerted on two tread members of any one grip unit under normal conditions, although it is of course understood that the adjacent tread members of two different units may be brought as close together as desired. For this purpose where the grips are to be used on heavy vehicles under ordinary road and street conditions, it is desirable to have the tread members of a single unit separated from each other by about one-eighth of the circumference of the wheel such as used in ordinary trucking vehicles and for many purposes a somewhat wider spacing is desirable, the six-tread grip giving ample traction and allowing a more effective restoring action of the resilient parts of the unit so as to be more desirable under extreme service conditions for these reasons.

Having described this invention in connection with a number of illustrative embodiments, proportions, sizes, shapes and materials of parts, to the details of which disclosure the invention is not of course to be limited, what is claimed as new and what is desired to be secured by Letters Patent is set forth in the appended claims.

I claim—

1. The tire grip adapted for use on wheels provided with resilient solid type tires comprising three integral grip units connected by flexible connectors to removably hold the same on the wheel, each grip unit comprising two substantially radially arranged arched resilient tread members having flat faces and inturned alining sides for coöperation with the wheel rim and circumferentially arranged resilient supports connected to both sides of said tread members and provided with outwardly extending ends for engagement with said connectors to prevent substantially deforming contact with the ground by more than one of said tread members at a time.

2. The tire grip adapted for use on wheels provided with resilient solid type tires comprising a number of integral grip units connected by flexible connectors to removably hold the same on the wheel, each grip unit consisting of two arched resilient tread members having substantially flat faces and inturned alining sides for coöperation with the wheel rim and circumferentially spacing resilient supports connected adjacent to their ends to both sides of said tread members and spacing the same apart to prevent deforming contact with the ground by more than one of said tread members at a time.

3. The tire grip comprising a plurality of resilient mutually supporting units and connectors to removably hold the same on a wheel each grip unit comprising a plurality of arched resilient tread members having alining sides for coöperation with the wheel rim and circumferentially spanning resilient supports connected to both sides of said tread members to space the same apart sufficiently to prevent substantial deforming contact with the ground by more than one of said tread members at a time.

4. The tire grip comprising a plurality of integral resilient grip units and connectors to removably hold the same on a wheel, each grip unit comprising a plurality of resilient tread members and circumferentially spanning resilient supports connected to both sides of said tread members to space said tread members apart as much as about one-eighth of a circumference and to exert a mutually supporting and restoring action on the tread member engaging the ground.

5. The tire grip comprising a plurality of resilient grip units and connectors to hold the same on a wheel, each grip unit comprising a plurality of resilient tread members and circumferentially spanning resilient supports rigidly connected to both sides of said tread members to space said tread members apart at least as much as about one-eighth of a circumference and to exert a mutually supporting action on the tread member in engagement with the ground.

6. The tire grip comprising a plurality of resilient grip units and connectors to hold the same on a wheel, each grip unit comprising a plurality of arched resilient tread members and circumferentially spanning resilient supports rigidly connected to both sides of said tread members to space said tread members apart at least as much as about one-eighth of a circumference and to exert a mutually supporting and restoring action on the single tread member in substantial deforming contact with the ground at any time, said tread members and supports being formed of flat tempered steel strip.

7. The tire grip comprising a plurality of resilient grip units and connectors to removably hold the same on a wheel each grip unit comprising two resilient tread members of flat strip and circumferentially spanning resilient support strips rigidly connected to both sides of said tread members to space the same apart sufficiently to prevent substantial deforming contact with the ground by more than one of said tread members at a time and to have a resilient mutually supporting action on the tread member in contact with the ground.

8. The tire grip comprising a plurality of resilient grip units each grip unit consisting of two arched resilient tread members having substantially flat faces and inturned alining sides for coöperating with the wheel rim and circumferentially spanning resilient supports connected adjacent to their ends to both sides of said tread members and spacing the same apart and flexible connectors comprising chain connectors connected to said grip units adjacent to the ends of said supports to hold the units on a wheel, said connectors comprising take-up devices to tighten the grip.

9. The tire grip comprising a plurality of resilient grip units, each grip unit consisting of two tread members and circumferentially spanning resilient supports rigidly connected adjacent to their ends to both sides of said tread members and spacing the same apart and flexible connectors connected to said grip units adjacent to the ends of said supports to hold the units on a wheel, said connectors comprising take-up devices to tighten the grip.

10. The tire grip comprising a plurality of grip units and connectors to removably hold the same on the wheel, each grip unit comprising a plurality of arched tread members and circumferentially spanning supports connected to both sides of said tread members to space the same apart sufficiently to prevent substantial deforming contact with the ground by more than one of said tread members at a time.

11. The tire grip comprising a plurality of resilient grip units, each grip unit consisting of two tread members of metal strip and circumferentially spanning resilient supports rigidly connected adjacent to their ends to both sides of said tread members and spacing the same apart at least as much as about one-twelfth of the wheel circumference and connectors connected to said grip units adjacent to the ends of said supports to hold the units on a wheel.

12. The tire grip comprising a plurality of grip units, each grip unit comprising a plurality of metallic tread members and circumferentially spanning metallic supports connected adjacent to their ends to both sides of said tread members and spacing the same apart and connectors connected to said grip units adjacent the ends of said supports to hold the units on a wheel.

13. A duplex grip unit for tire grips comprising the following parts: two end members adapted to span across the tire, radially disposed extensions of said end members on each side of the wheel, and side members, one on each side of the wheel, integrally connecting the inner ends of said radially disposed extensions, the structure having at each of the corners where the radial extensions join the side members means for the attachment of side-holding devices.

14. A tire grip embodying a series of duplex grip units, each having two end members adapted to span across the tire, radially disposed extensions of said end members on each side of the wheel, and side members, one on each side of the wheel, integrally connecting the inner ends of said extensions, holding means flexibly connected to each end of each duplex grip unit on both sides of the wheel, and means to hold the tire grip as a whole upon the wheel.

15. A tire grip embodying a series of duplex grip units, each comprising the following parts: two end members adapted to span across the tire, extensions of said end members on each side of the wheel, and side members, one on each side of the wheel, integrally connecting the inner ends of said extensions, holding members flexibly connected to each end of each duplex grip unit on both sides of the wheel, and means to hold the tire grip as a whole upon the wheel.

WALTER B. LASHAR.

Witnesses:
 HARRY L. DUNCAN,
 JESSIE B. KAY.